United States Patent
Komma et al.

(10) Patent No.: US 8,385,169 B2
(45) Date of Patent: Feb. 26, 2013

(54) OPTICAL DISC DRIVE AND OPTICAL INFORMATION SYSTEM

(75) Inventors: Yoshiaki Komma, Osaka (JP); Kanji Wakabayashi, Kyoto (JP); Fumitomo Yamasaki, Nara (JP); Toshiyasu Tanaka, Osaka (JP)

(73) Assignee: Panasonic Corporation, Osaka (JP)

( * ) Notice: Subject to any disclaimer, the term of this patent is extended or adjusted under 35 U.S.C. 154(b) by 577 days.

(21) Appl. No.: 11/965,469

(22) Filed: Dec. 27, 2007

(65) Prior Publication Data

US 2009/0010137 A1 Jan. 8, 2009

Related U.S. Application Data

(60) Provisional application No. 60/877,613, filed on Dec. 29, 2006.

(51) Int. Cl.
*G11B 7/00* (2006.01)

(52) U.S. Cl. .................. 369/53.11; 369/112.23

(58) Field of Classification Search .................. 369/94, 369/112.23, 112.24, 53.11, 283
See application file for complete search history.

(56) References Cited

U.S. PATENT DOCUMENTS

| | | | |
|---|---|---|---|
| 6,781,771 B2 * | 8/2004 | Kitahara et al. | 359/719 |
| 2003/0007436 A1 * | 1/2003 | Komma et al. | 369/53.2 |
| 2003/0227859 A1 * | 12/2003 | Hirai | 369/112.12 |
| 2005/0083813 A1 * | 4/2005 | Ogasawara | 369/53.2 |
| 2005/0162999 A1 * | 7/2005 | Yamashita | 369/44.34 |
| 2005/0163015 A1 * | 7/2005 | Sato et al. | 369/112.1 |
| 2006/0239139 A1 * | 10/2006 | Kataoka et al. | 369/44.23 |
| 2007/0047410 A1 * | 3/2007 | Chen et al. | 369/53.2 |
| 2007/0047424 A1 * | 3/2007 | Wada et al. | 369/112.23 |
| 2007/0070849 A1 * | 3/2007 | Saitoh et al. | 369/53.22 |

FOREIGN PATENT DOCUMENTS

| | | |
|---|---|---|
| JP | 10-55602 | 2/1998 |
| JP | 10-241268 | 9/1998 |
| JP | 2001-202680 | 7/2001 |
| JP | 2002-117534 | 4/2002 |

\* cited by examiner

*Primary Examiner* — Thomas Alunkal
(74) *Attorney, Agent, or Firm* — Wenderoth, Lind & Ponack, L.L.P.

(57) ABSTRACT

An optical disc type is determined by detecting focus error signals and an amount of returned light, while (i) emitting light having a wavelength maximizing a focal length and (ii) moving an objective lens in a direction of an optical axis. If an S shape and AS immediately after a surface are greater than those at the surface, the optical disc is determined to have a largest capacity. It is also determined whether there is a reflective layer at a depth equal or less than 0.1 mm, if not, then it is determined whether there is a reflective layer at a depth of 0.6 mm. If there is a reflective layer at the depth of 0.6 mm, then the type of the reflective layer is determined based on TE/RF signals, using blue light. If the blue light is not adaptable, red light is emitted to replay at a depth of 0.6 mm.

6 Claims, 10 Drawing Sheets

OPTICAL DISC DRIVE AND OPTICAL INFORMATION SYSTEM

This application claims the benefit of U.S. Provisional Application No. 60/877,613, filed Dec. 29, 2006.

BACKGROUND OF THE INVENTION

1. Field of the Invention

The present invention relates to an optical disc, an optical disc drive for replaying and recording information from and to the optical disc, and information apparatuses and systems using the optical disc and the optical disc drive, such as a computer, a disc player, a car navigation system, an optical disc recorder and a vehicle. In addition, the present invention relates to a method for replaying information and an integrated circuit.

2. Description of the Related Art

Digital versatile discs (DVDs) have been known as optical discs capable of storing data with high capacities, since digital information can be recorded in these digital versatile discs with recording densities which are about 6 times those of compact discs (CDs). In recent years, there has been a need for optical discs having larger capacities, along with the increase of amounts of information to be recorded in optical discs. In order to increase the capacity of an optical disc, it is necessary to reduce the size of a light spot formed by light directed to the optical disc when information is recorded to the optical disc or information recorded in the optical disc is replayed, for increasing the density of information recorded therein. The reduction of the size of the light spot can be realized by employing a light source which emits laser light with a shorter wavelength and employing an objective lens with a greater numerical aperture (NA).

For DVDs, a light source with a wavelength of 660 nm (red) and an objective lens with a numerical aperture (NA) of 0.6 have been employed. Further, for BDs (Blu-Ray Discs) which have been already commercially available, a blue laser with a wavelength of about 405 nm and an objective lens with an NA of 0.85 have been employed, which have realized a recording density which is five times that of existing DVDs.

Further, as optical discs which require blue lasers, there are HD-DVDs which require an objective lens having an NA of 0.65 and have been commercially available.

A DVD is an optical disc including transparent base materials with a thickness of 0.6 mm which requires a laser light source with a wavelength of about 660 nm for recording or replaying, also requires an objective lens with a numerical aperture NA of 0.60 and includes recording layer(s) each having a recording capacity of about 4.7 GByte. A DVD is constituted by two transparent base materials with a thickness of 0.6 mm which are attached to each other and thus has a total thickness of 1.2 mm which equals to that of a CD.

A BD is an optical disc including a transparent base material with a thickness of about 0.1 mm which requires laser light with a wavelength of about 405 nm for recording or replaying, also requires an objective lens with a numerical aperture NA of 0.85 and includes recording layer(s) each having a recording capacity of about 25 GByte. A BD is constituted by a disc substrate with a thickness of 1.1 mm, recording layers provided on the disc substrate and a transparent cover layer with a thickness of 0.1 mm which covers the recording layers and has a total thickness of 1.2 mm which equals to that of a CD. Recording and replaying information on and from a BD is performed by converging blue laser light on the recording layers through the transparent cover layer with a thickness of 0.1 mm, using an objective lens with a numerical aperture of 0.85. The increase of the coma aberration caused by the use of laser light with a shorter wavelength and an objective lens with a greater NA is suppressed by setting the thickness of the transparent cover layer in a BD for passing the laser light therethrough to a smaller thickness of about 0.1 mm.

On the other hand, an HD-DVD is an optical disc which requires an objective lens with a numerical aperture NA of 0.65, includes recording layer(s) each having a recording capacity of about 15 GByte, is constituted by two transparent base materials with a thickness of 0.6 mm which are attached to each other and thus has a total thickness of 1.2 mm which equals to that of a CD.

As such optical discs, there are three types of optical discs, which are replay-only type optical discs which have prepits as recording layers, write-once type optical discs which include dye layers as recording layers, and rewritable type optical discs which include phase-change layers as recording layers.

As described above, there are optical discs with various structures, such as CDs, DVDs, BDs, HD-DVDs. The characteristic of the optical discs is that these optical discs can be inserted into and ejected from apparatuses so as to enable recording and replaying information on and from various types of optical discs. Accordingly, it is desirable that an apparatus for replaying or recording information from and to optical discs is adapted to receive various types of optical discs, determine the types of them and properly perform focusing and groove-tracking controls thereon for replay information therefrom.

A method for distinguishing between a CD or a DVD is disclosed in JP-A No. 10-55602, for addressing the aforementioned need.

FIG. 11 is a flow chart briefly illustrating the optical-disc distinguishing method described in JP-A No. 10-55602.

If a command for replay of an optical disc is output (#101), then the numerical aperture (NA) of an objective lens for converging light on the optical disc is set to a certain value (#102), and the objective lens is moved in the direction of an optical axis by an actuator (#103). At this time, the type of the optical disc is determined, based on detection signals such as focus error signals output from an optical head device (#104).

If this determination was a first determination (NO in #105), the value of NA is switched (#106) and, thereafter, the objective lens is moved, again, in the direction of the optical axis by the actuator. At this time, the type of the optical disc is determined, based on detection signals such as focus error signals output from an optical head device. After the second determination is completed (YES in #105), it is determined whether or not the results of these determinations are the same (#107).

If they are the same (YES in #107), then the value of NA is set according to the result and, then, replay of the optical disc is performed (#108). If the results of the two determinations are different from each other (NO in #107), an alarm is generated (#109).

Similarly, JP-A No. 10-241268, JP-A No. 2002-117534, JP-A No. 2001-202680 and the like disclose methods for distinguishing the type of an optical disc.

JP-A No. 10-241268 discloses a method which provides light sources for red light and infrared light in an optical head device, causes them to emit light, determines the reflectivity of an optical disc and, from the result thereof, determines the type of the optical disc.

JP-A No. 2002-117534 discloses a method which determines the type of an optical disc, using tracking error signals detected by a method called a differential phase detection (DPD) method. In this case, tracking error signals are signals indicative of the deviation of a converged spot from the center of rows of pits and the center of track grooves in the optical disc. In the method disclosed in JP-A No. 2002-117534, the type of an optical disc is determined, by observing the change of tracking error signals in cases where pulse signals for use in detecting DPD are limited to signals with lengths equal to or less than a certain length.

Further, JP-A No. 2001-202680 discloses a method which determines the type of an optical disc, by observing the ratio of information signals to the amount of light reflected by the optical disc, namely the modulation degree of information signals.

SUMMARY OF THE INVENTION

As described in BACKGROUND OF THE INVENTION, there are various types of commercially-available optical discs including base materials with thicknesses of about 0.1 mm, 0.6 mm and 1.2 mm which require objective lenses with NAs in the range of 0.45 to 0.85 for converging a light beam on the optical disc recording surface and require wavelengths in the range of blue (a wavelength of about 405 nm) to infrared (a wavelength of about 800 nm) for replaying and recording.

However, the documents described in BACKGROUND OF THE INVENTION disclose no disc distinguishing method adaptable to all the aforementioned various types of discs.

Further, as the value of NA of an objective lens is increased, the working distance (WD) is inescapably decreased. Here, the working distance is the interval between the objective lens surface and the optical disc surface when the converged spot of a light beam is formed on the optical disc recording surface, namely in a state where focus is achieved. In the case where the working distance is smaller, it is desirable to take measures against the impingement of the objective lens on the optical disc, but the aforementioned literatures disclose no optical-disc distinguishing method which takes such measures.

Further, there have also been commercially-available optical discs (herein after, referred to as mixed discs) having a plurality of recording layers provided around at a depth of about 0.6 mm in the base material, wherein the plurality of recording layers include recording layers with a higher recording density which require a wavelength in the blue range for recording and replaying and recording layers with a lower recording density which require a wavelength in the red range (a wavelength of about 660 nm) for recording and replaying. There is a need for a method for distinguishing optical discs including mixed discs, but the aforementioned literatures do not disclose such a method.

In order to overcome at least one of the issues of the prior art, there are provided structures as follows.

According to a first aspect of the present invention, there is provided an optical disc drive comprising:

an optical head device comprising a plurality of light sources for emitting light with different wavelengths respectively, an objective lens for converging light emitted from the light sources on an information recording layer in an optical disc, a photo detector for receiving light reflected by the recording layer in the optical disc in the case where the light is converged on the recording layer by the objective lens and photoelectrically converts the light into electric signals, and an objective-lens actuator for moving the objective lens in the direction of an optical axis;

a motor for rotating the optical disc; and a control device for controlling operations of the optical head device and the motor;

wherein, in the case where a command for replay of signals is output, the control device searches for an information recording surface closest to the surface of the optical disc, based on signals obtained from the optical head, while moving the objective lens in the direction of the optical axis by the objective-lens actuator, in the case where there is an information recording surface at a position at a distance in the range of 0.2 mm to 0.8 mm from the surface of the optical disc, the control device searches for an information recording surface at a position farther from the surface of the optical disc, and the control device performs, at first, focusing control with respect to an information recording surface at a position which is farthest from the surface of the optical disc and at a distance not more than 0.8 mm from the surface of the optical disc.

According to a second aspect of the present invention, there is provided an optical disc drive comprising:

an optical head device comprising a plurality of light sources which emit light with different wavelengths, an objective lens which converges light emitted from the light sources on an information recording layer in an optical disc, a photo detector which receives light reflected by the recording layer in the optical disc in the case where the light is converged on the recording layer by the objective lens and photoelectrically converts the light into electric signals, and an objective-lens actuator for moving the objective lens in the direction of an optical axis;

a motor for rotating the optical disc; and a control device for controlling operations of the optical head device and the motor;

wherein, in the case where a command for replay of signals is output, the control device causes laser light with a wavelength which maximizes the air-equivalent length between the focal point converged by the objective lens and the surface of the objective lens, out of the laser light with a plurality of wavelengths provided in the optical head device, to be emitted at first, and determines the type of an optical disc based on signals obtained from the optical head, while moving the objective lens in the direction of the optical axis by the objective-lens actuator.

According to a third aspect of the present invention, there is provided an optical disc drive comprising:

an optical head device comprising a plurality of light sources for emitting light with different wavelengths, an objective lens for converging light emitted from the light sources on an information recording layer in an optical disc, a photo detector for receiving light reflected by the recording layer in the optical disc in the case where the light is converged on the recording layer by the objective lens and photoelectrically converts the light into electric signals, and an objective-lens actuator for moving the objective lens in the direction of an optical axis;

a motor for rotating the optical disc; and a control device for controlling operations of the optical head device and the motor;

wherein, in the case where a command for replay of signals is output, the control device causes laser light with a shortest wavelength, out of the laser light with a plurality of wavelengths provided in the optical head device, to be emitted at first, and determines the type of an optical disc based on signals obtained from the optical head, while moving the objective lens in the direction of the optical axis by the objective-lens actuator.

According to a fourth aspect of the present invention, there is provided an optical disc drive comprising:

an optical head device comprising a plurality of light sources for emitting light with different wavelengths, an objective lens for converging light emitted from the light sources on an information recording layer in an optical disc, a photo detector for receiving light reflected by the recording layer in the optical disc in the case where the light is converged on the recording layer by the objective lens and photoelectrically converts the light into electric signals, and an objective-lens actuator for moving the objective lens in the direction of an optical axis;

a motor for rotating the optical disc;

a memory for storing the sensitivity of the objective-lens actuator; and a control device for controlling the operations of the optical head device and the motor;

wherein, in the case where a command for replay of signals is output, the control device determines the thickness of a base material to determine the type of an optical disc, based on signals obtained from the optical head and the sensitivity of the objective-lens actuator, while moving the objective lens in the direction of the optical axis by the objective-lens actuator.

With the structure of the present invention, it is possible to distinguish various types of optical discs rapidly with a simple structure, which offers the advantage of replaying or recording information from and to a plurality of types of optical discs with a single optical disc drive. Further, in performing replay of the mixed disc, it is possible to replay images with high qualities and information with large capacities certainly without missing the presence of recording layers with higher densities.

BRIEF DESCRIPTION OF THE DRAWINGS

These and other aspects and features of the present invention will become clear from the following description taken in conjunction with the preferred embodiments thereof with reference to the accompanying drawings, in which.

DETAILED DESCRIPTION OF THE PREFERRED EMBODIMENTS

Figure 1:
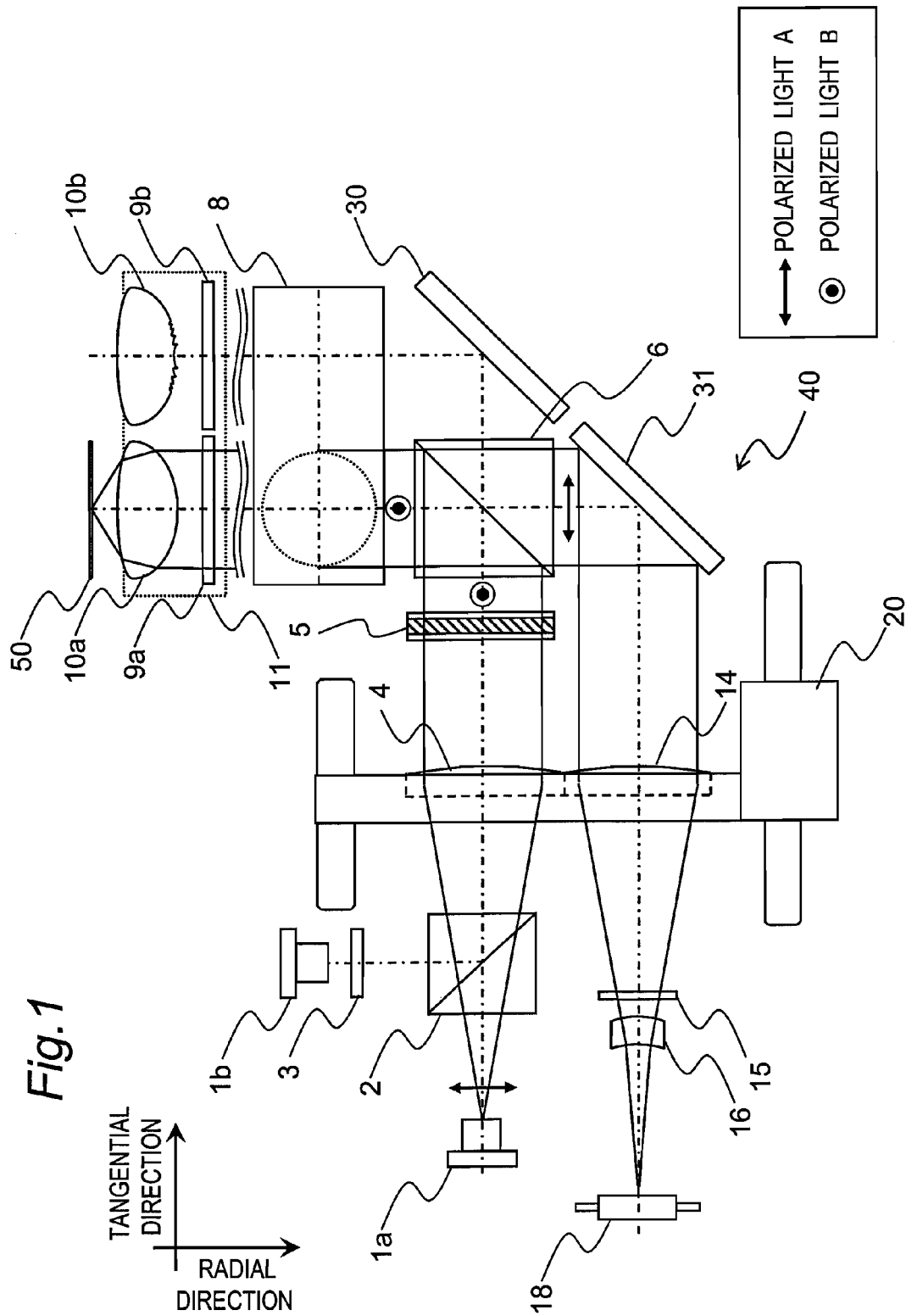
FIG. 1 is an explanation diagram illustrating an optical head device according to an embodiment of the present invention, at state where a first optical disc is used therein.

Before the description of the present invention proceeds, it is to be noted that like parts are designated by like reference numerals throughout the accompanying drawings.

First Embodiment

Figure 2:
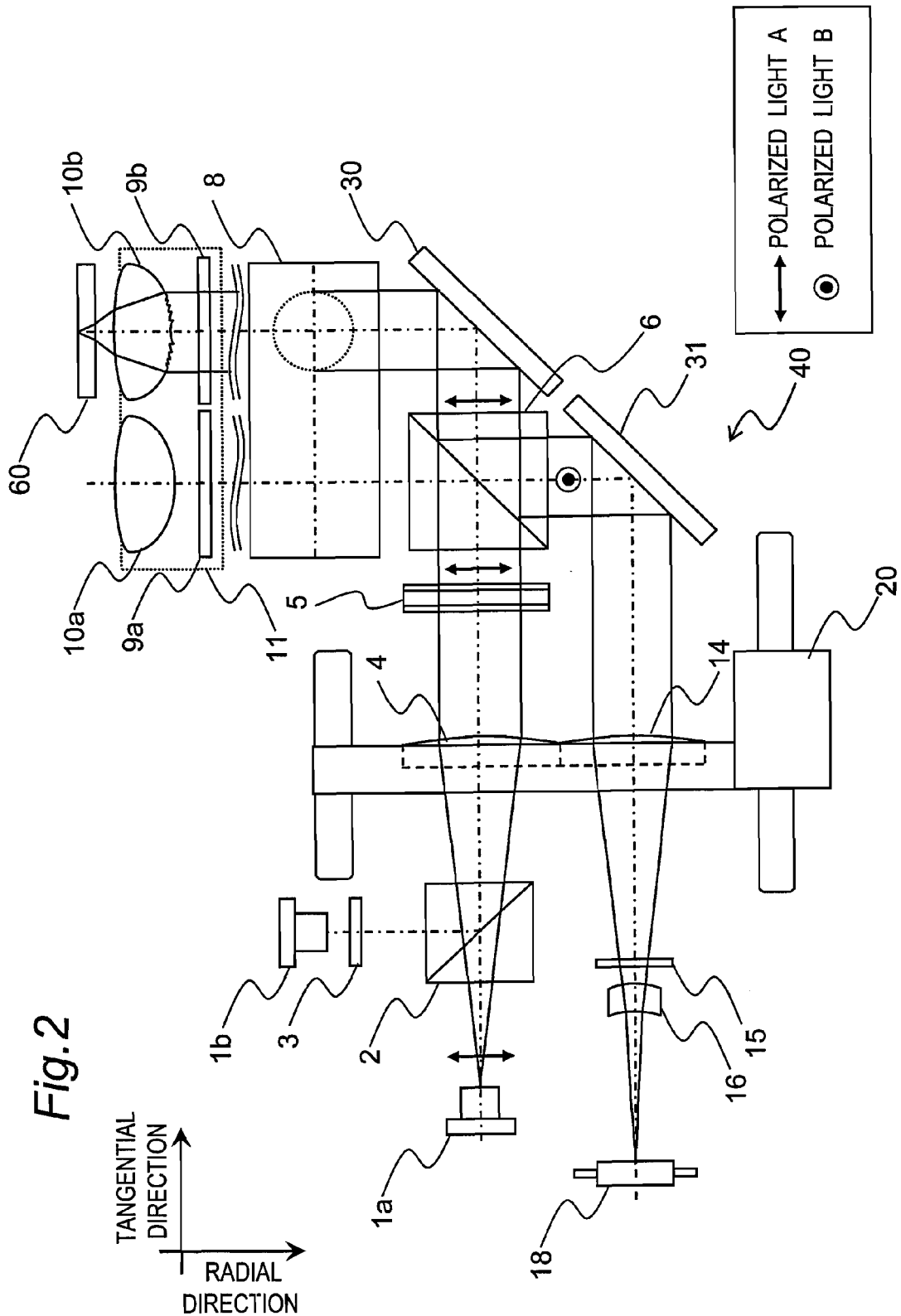
FIG. 2 is an explanation diagram illustrating an optical head device according to an embodiment of the present invention, at state where a second optical disc is used therein.
Figure 3:
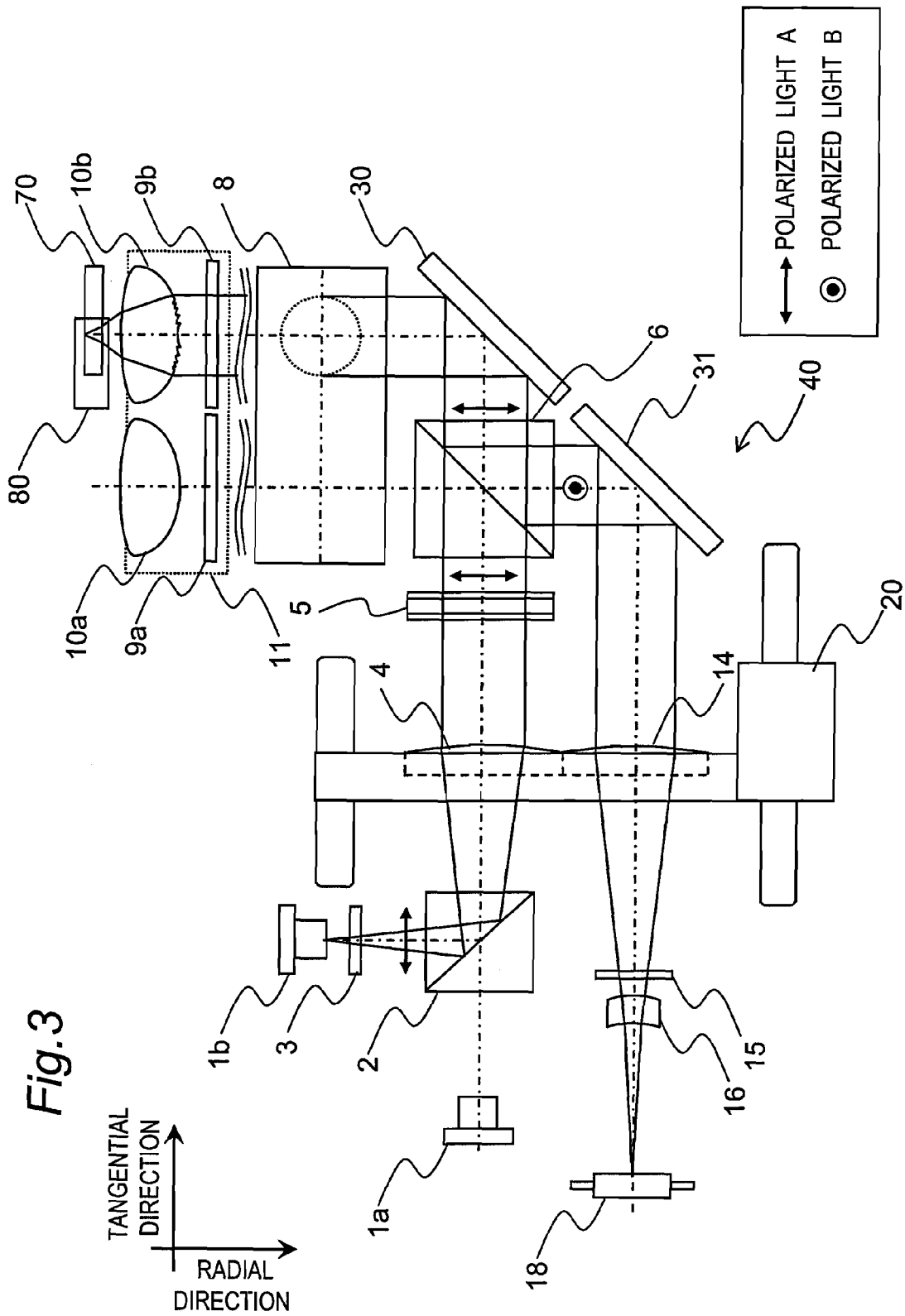
FIG. 3 is an explanation diagram illustrating an optical head device according to an embodiment of the present invention, at state where a third or fourth optical disc is used therein.

FIG. 1, FIG. 2 and FIG. 3 are views schematically illustrating an exemplary optical head device for use in a first embodiment of the present invention.

Referring to FIG. 1, FIG. 2 and FIG. 3, an optical head device 40 includes: a first light source 1a which emits blue-violet laser light, a second light source 1b which emits laser light having two wavelengths which are red laser light and infrared laser light, a dichroic prism 2, a diffraction grating 3, a forward-path collimate lens 4, a liquid crystal device 5, a polarization beam splitter 6, a turn-up mirror 8, ¼-wavelength plates 9a and 9b, objective lenses 10a and 10b, an objective-lens actuator 11, a backward-path collimate lens 14, a detection hologram 15, a detection lens 16, a photodetector 18, a collimate-lens actuator 20, a first reflection mirror 30, a second reflection mirror 31.

Further, an optical disc 50 has a base-material thickness of about 0.1 mm or less which requires an objective lens with an NA of about 0.85 for converging a light beam to the optical-disc recording surface thereof and also requires a wavelength in the blue range (a wavelength of about 405 nm) for replaying and recording. Hereinafter, in the present application, this optical disc will be referred to as a first optical disk.

Further, an optical disc 60 has a base-material thickness of about 0.6 mm which requires an objective lens with an NA of about 0.65 for converging a light beam to the optical-disc recording surface thereof and also requires a wavelength in the blue range (a wavelength of about 405 nm) for replaying and recording. Hereinafter, in the present application, this optical disc will be referred to as a second optical disc.

Further, an optical disc 70 has a base-material thickness of about 0.6 mm which requires an objective lens with an NA of about 0.6 for converging a light beam to the optical-disc recording surface thereof and also requires a wavelength in the red range (a wavelength of about 660 nm) for replaying and recording, namely a DVD. Hereinafter, in the present application, this optical disc will be referred to as a DVD or a third optical disc.

Further, an optical disc 80 has a base-material thickness of about 1.2 mm which requires an objective lens with an NA of about 0.45 or more for converging a light beam to the optical-disc recording surface thereof and also requires a wavelength in the infrared range (a wavelength of about 800 nm) for replaying and recording, namely a CD. Hereinafter, in the present application, this optical disc will be referred to as a CD or a fourth optical disc.

Further, an optical disc having a base-material thickness of about 0.6 mm and including the same recording layers as those of the second optical disc and the third optical disc will be referred to as a mixed disc.

The optical head device 40 according to the present embodiment performs replaying and recording information from and to the first to fourth optical discs and the mixed disc.

With reference to FIG. 1, there will be described operations of the optical head device 40 for recording and replaying information from and to the first optical disc 50. The light source 1a emits blue or blue-violet laser light, and the blue or blue-violet laser light is passed through the dichroic prism 2 and then is converted into substantially-parallel light by the forward-path collimate lens 4. The forward-path collimate lens 4 is held by a lens holder in the collimate-lens actuator 20 and can be moved along the optical axis of the laser light through a step motor. The blue laser light emitted from the first light source 1a is polarized in the direction of polarization of polarized light A (the upward and downward directions in the figure). The blue laser light which has been converted into the substantially-parallel light is passed through the liquid crystal device 5. The liquid crystal device 5 changes the direction of polarization of the blue-violet laser light incident thereto to the direction of polarized light B (the direction perpendicular to the paper plane, in the figure) which is rotated therefrom by 90 degree, when a voltage is applied to the electrodes (not shown) of the liquid crystal device 5. The blue-violet laser light which has been converted into the polarized light B is reflected by the polarization beam splitter 6, then the direction of the optical axis thereof is folded by about 90 degree to the direction perpendicular to the paper plane by the turn-up mirror 8, then the blue-violet laser light is converted into a circularly polarized light by the ¼-wavelength plate 9a and then is converged as a light spot on the information recording surface of the first optical disc 50 through the transparent base material by the first objective lens 10a.

The ¼-wavelength plate 9a, the ¼-wavelength plate 9b, the first objective lens 10a and the second objective lens 10b follow the sway of the surface of the first optical disc 50 and the eccentricity of the information track. Therefore, they can be mounted to the objective-lens actuator 11 such that they can be integrally driven thereby.

Further, for convenience of description, the parts above the wavy lines illustrate, in a direction parallel to the paper plane, the optical axes which have been folded in the direction perpendicular to the paper plane by the turn-up mirror 8 (this applies to FIG. 2 and FIG. 3).

When a light spot is converged on the information recording surface of the first optical disc 50, a spherical aberration occurs due to the error of the base-material thickness of the first optical disc 50. The spherical aberration is corrected by making the laser light incident to the first objective lens 10a to be diverged light or converged light for generating a spherical aberration with the polarity opposite from that of the spherical aberration caused by the base-material thickness. For example, as illustrated in FIG. 1, the forward-path collimate lens 4 is moved forwardly and rearwardly along the direction of the optical axis, using the collimate-lens actuator 20. By making the laser light incident to the first objective lens 10a to be diverged light or converged light, it is possible to generate a spherical aberration with the opposite polarity through the first objective lens 10a as described above, thereby canceling the spherical aberration caused by the error of the base-material thickness.

The blue laser light which has been reflected by the information recording surface of the first optical disc 50 in the backward path is passed through the-¼ wavelength plate 9a to be converted into polarized light A, then is passed through the polarization beam splitter 6, then is reflected by the second reflection mirror 31, then is converted from the substantially-parallel light into converged light by the backward-path collimate lens 14, then is divided by the detection hologram 15 into luminous fluxes for detection of servo signals, then is provided with a predetermined astigmatism by the detection lens 16 and then is directed to the photo detector 18 which generates information signals and servo signals.

Next, with reference to FIG. 2, there will be described operations of the optical head device 40 for replaying information from the second optical disc 60. The blue laser light emitted from the light source 1a is passed through the dichroic prism 2 and then is converted into substantially-parallel light by the forward-path collimate lens 4.

The blue laser light emitted from the first light source 1a is polarized in the direction of polarization of polarized light A (the upward and downward directions in the figure). The blue laser light which has been converted into the substantially-parallel light is passed through the liquid crystal device 5. When no voltage is applied to the electrodes (not shown) of the liquid crystal device 5, the liquid crystal device 5 passes, therethrough, the blue-violet laser light incident thereto, without changing the direction of polarization thereof. The blue-violet laser light which is kept at the polarized light A is passed through the polarization beam splitter 6, then is reflected by the first reflection mirror 30, then the direction of its optical axis is folded by about 90 degree to the direction perpendicular to the paper plane by the turn-up mirror 8, then is converted into a circularly polarized light by the ¼-wavelength plate 9b and then is converged as a light spot on the information recording surface of the second optical disc 60 through the transparent base material by the second objective lens 10b.

As described above, the liquid crystal device 5 is an exemplary optical-path switching device. That is, in cases where an electric circuit 153 (see FIG. 4) as an exemplary control device determines the type of the optical disc as will be described later, if the electric circuit 153 determines, as a result, that a recording layer exists at a distance of 0.11 mm or less from the surface of the optical disc, the optical-path switching device 5 sets the optical path to the optical path leading to the objective lens 10a having a larger numerical aperture, but if the electric circuit 153 determines that the recording layer does not exist at a distance of 0.11 mm or less from the surface of the optical disc, the optical-path switching device 5 sets the optical path to the optical path leading to the second objective lens 10b.

Further, by moving the forward-path collimate lens 4 forwardly and rearwardly in the direction of the optical axis using the collimate-lens actuator 20, it is possible to make the laser light incident to the second objective lens 10b to be diverged light or converged light for canceling the spherical aberration caused by the error of the base-material thickness of the second optical disc 60.

The blue-violet laser light reflected by the information recording surface of the second optical disc 60 is passed through the ¼-wavelength plate 9b to be converted into polarized light B, then is reflected by the first reflection mirror 30 and the polarization beam splitter 6, then is reflected by the second reflection mirror 31, then is converted from the substantially-parallel light into converged light by the backward-path collimate lens 14, then is passed through the detection hologram 15, then is provided with a predetermined astigmatism by the detection lens 16 and then is directed to the light detector 18 which generates information signals and servo signals.

Next, with reference to FIG. 3, there will be described operations of the optical head device 40 for recording and replaying information to and from the DVD, namely the third optical disc 70, or the CD, namely the fourth optical disc 80. The red laser light emitted from the light source 1b is passed through the diffraction grating 3 to generate diffracted light. The diffracted light is used for creating tracking error signals according to the well-known differential push pull (DPP) method. The diffracted light is then is reflected by the dichroic prism 2 and then is converted into substantially-parallel light by the forward-path collimate lens 4.

The direction of polarization of the red laser light emitted from the second light source 1b is set to the direction of the polarization of polarized light A (the upward and downward directions in the figure). The liquid crystal device 5 passes the red laser light therethrough without changing the direction of polarization thereof. The red laser light which is kept at the polarized light A is passed through the polarization beam splitter 6, then is reflected by the first reflection mirror 30, then the direction of its optical axis is folded by about 90 degree to the direction perpendicular to the paper plane by the turn-up mirror 8, then is converted into a circularly polarized light by the ¼-wavelength plate 9b and then is converged as a light spot on the information recording surface of the DVD 70 through the base material by the second objective lens 10b.

The red laser light reflected by the information recording surface of the DVD 70 in the backward path is passed through the ¼-wavelength plate 9b to be converted into polarized light B, then is reflected by the first reflection mirror 30 and the polarization beam splitter 6, then is reflected by the second reflection mirror 31, then is converted from the substantially-parallel light into converged light by the backward-path collimate lens 14, then is passed through the detection hologram 15, then is provided with a predetermined astigmatism by the detection lens 16 and then is directed to the photo detector 18 which generates information signals and servo signals.

Further, it is possible to perform recording and replaying to and from the CD 80, by emitting infrared laser light from the second light source 1b capable of emitting laser light with two wavelengths. Further, the operations of the optical head device 40 for recording and replaying information to and from the CD 80 are the same as those for recording and replaying information to and from the aforementioned DVD 70 and, therefore, are not described herein, in detail.

Next, there will be described, in detail, the functions of the first objective lens 10a and the second objective lens 10b.

The first objective lens 10a, which is an objective lens dedicated for recording or replaying information to and from the first optical disc 50, has a numerical aperture NA of 0.85 and is designed to be capable of forming a light spot as a diffraction limit on the first optical disc 50 having a base-material thickness of about 0.1 mm.

On the other hand, the second objective lens 10b has a blade-shaped diffraction structure having a sawtooth-shaped cross-sectional area at least at a single surface thereof such as, for example, the incident surface (the surface closer to the light source) thereof in the present embodiment, in order to be adaptable with the second optical disc 60, the DVD 70, the CD 70 and the CD 80. The blade-shaped diffraction structure is corrected for aberrations, such that it can converge the laser light with the respective wavelengths, up to a diffraction limit, on the second optical disc 60, the DVD 70 and the CD 80 to and from which information is to be recorded and replayed, in cooperation with the power of the refraction by the second objective lens 10b. The second objective lens 10b having the blade-shaped diffraction structure for diffracting a portion of the incident light as described above is capable of forming a light spot as a diffraction limit on optical discs having different base-material thicknesses. Further, the area of the second objective lens 10b which is designed to converge infrared light on the CD 80 can be limited to a center portion around the optical axis, and the outer peripheral portion thereof can be designed to converge blue light and red light only on the second optical disc 60 and the DVD 70 in cooperation with the center portion thereof, which can restrict the value of NA for the CD 80 to about 0.45 while expanding the value of NA for the second optical disc 60 and the DVD 70 to about 0.65.

Also, the second objective lens 10b is not limited to an objective lens having a blade-shaped diffraction structure formed at its incident surface. For example, a refractive lens having a positive power and a hologram lens separated therefrom can be integrally driven to perform recording and replaying to and from the second optical disc 60, the DVD 70 and the CD 80. Further, the use of such a separated hologram lens eliminates the necessity of forming a diffraction structure at a lens surface inclined at a large angle, thereby offering the merit of ease of forming the die therefor.

Figure 4:
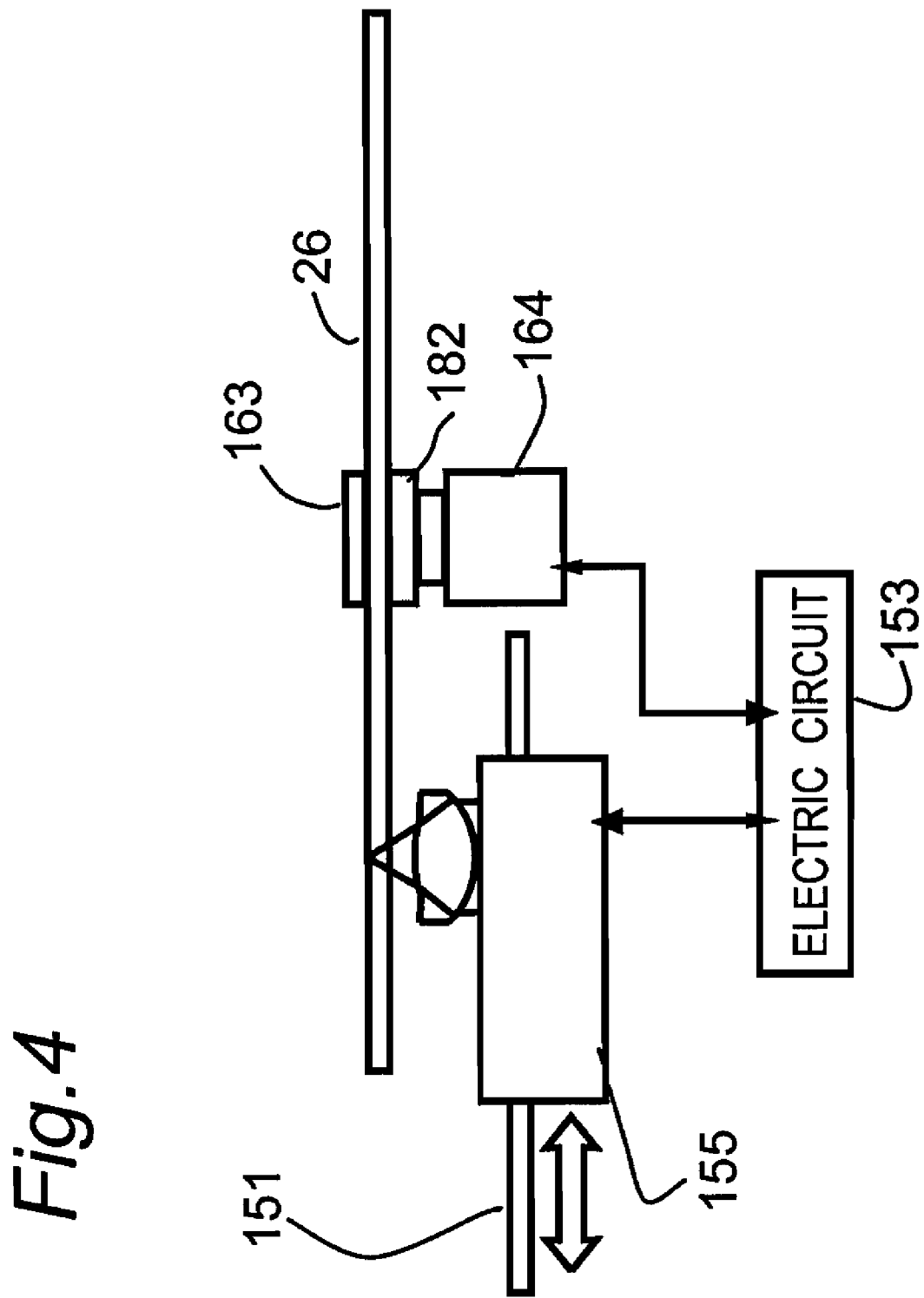
FIG. 4 is an explanation diagram of an optical disc drive according to an embodiment of the present invention.

FIG. 4 illustrates an example of an optical disc drive for replaying of an optical disc, according to the present invention. Referring to FIG. 4, an optical disc 26 is placed on a turn table 182 and is rotated by a motor 164. The optical disc 26 includes the optical discs 50, 60, 70 and 80 and the mixed disc which have been described in the aforementioned embodiments in the present application. The optical head device 40 is roughly moved to a track in the disc in which desired information exists, by a driving device 151 for the optical head device 151.

Further, the optical head device 40 sends focus error (focal-point error) signals and tracking error signals to the electric circuit 153, according to the positional relationship with the optical disc 26. In response to these signals, the electric circuit 153 sends signals for finely moving the objective lens, to the optical head device 40. According to the signals, the optical head device 40 performs focus servo (controlling) and tracking controlling with respect to the optical disc and also performs reading, writing (recording) or erasing information.

Hereinafter, there will be described a method for determining the type of an optical disc, in cases of performing replay of various types of optical discs, as in the optical disc drive 167 according to the present embodiment. With the following replaying method, it is possible to offer the advantage of performing replaying or recording from or to various types of optical discs with a single optical disc drive, as well as starting replaying in a short time. Further, it is possible to prevent the objective lens and the optical disc from impinging on each other in determining the type of the optical disc, thereby preventing the surface of the optical disc from being blemished and preventing the optical head device from being damaged. Further, in performing replay of the mixed disc, it is possible to replay, certainly, images with high qualities and information with large capacities, without missing the presence of recording layers with high densities.

Figure 5:
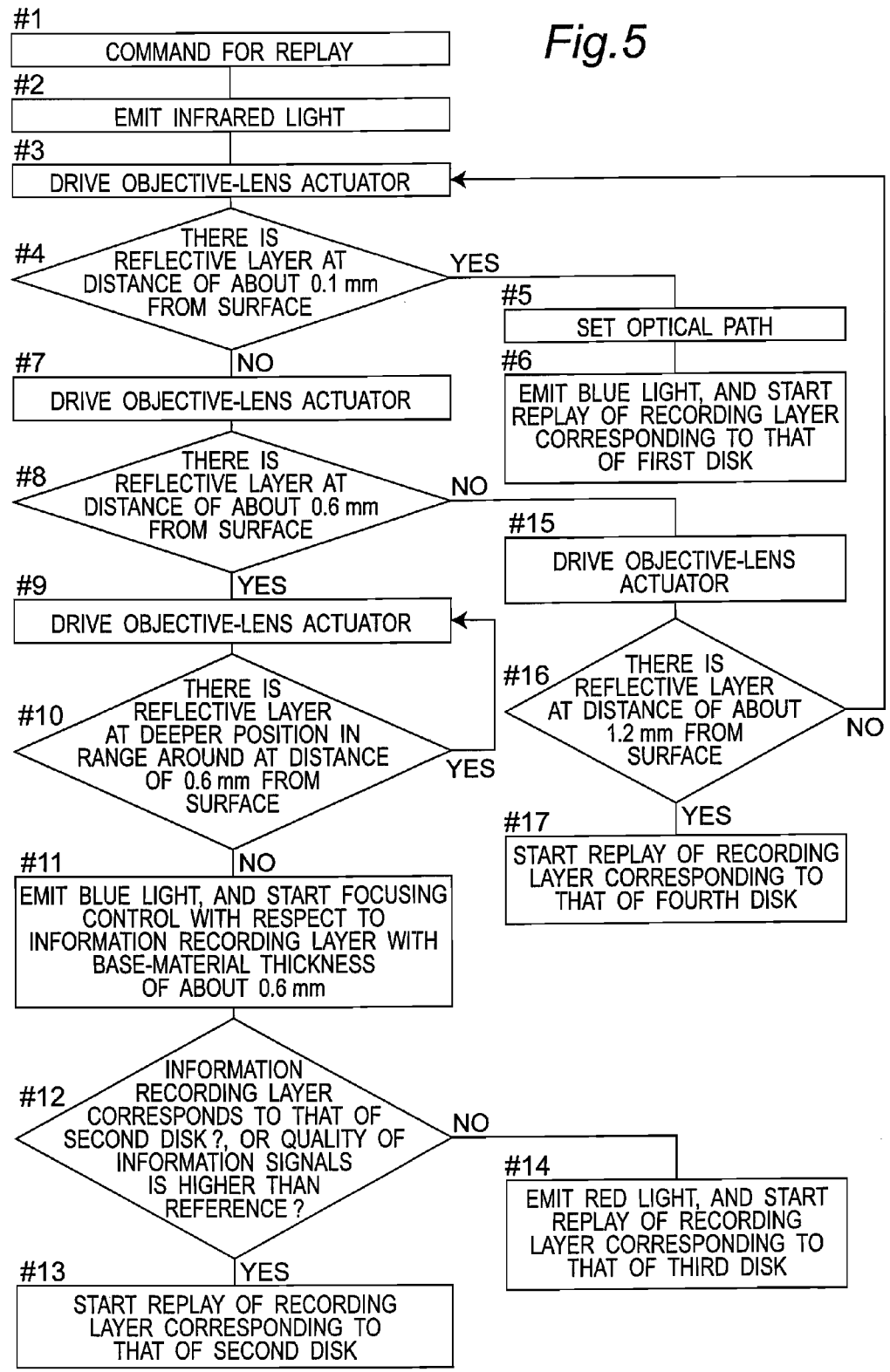
FIG. 5 is a flow chart illustrating a determination method according to an embodiment of the present invention.

FIG. 5 is a flow chart illustrating a method for determining the type of an optical disc according to an embodiment of the present invention.

It is an object of the present example of the present application to provide a method for determining the type of an optical disc which is adaptable to various types of discs, such as the first optical disc, the second optical disc, the third optical disc, the fourth optical disc and the mixed optical disc. Particularly, when there may be cases where a light beam should be converged with an objective lens having a larger NA and a smaller working distance (WD) as in the case of the first optical disc, it is desirable to take measures against the impingement of the objective lens on the optical disc. Therefore, the present application focuses attention on the choice of the focal point of the objective lens which is realized by the combination of the objective lens and the light with a plurality of wavelengths generated from the light source included in the optical head device 40.

Assuming that an optical disc has been inserted into the optical disc drive according to the present application, an effective clue for determining the type of the optical disc is the distance between the optical disc surface and the information recording layer, namely the base-material thickness. In order to determine the base-material thickness, it is preferable to employ the following method, for example. The objective lens is moved in the direction of the optical axis by the objective-lens actuator 11, and the amount of light reflected back by the optical disc and the intensities of focus error signals obtained from the reflected-back light are determined. The position at which the amount of returned light increases and the position at which the focus error signal changes positively or negatively by a certain amount are determined to be the position of the optical disc surface and the position of the information recording layer. For example, a slice level voltage can be provided and, when the magnitude relationship between the slice level signal voltage and the focus error signal voltage is reversed, it can be determined that the focus error signal voltage has changed by a certain amount. The base-material thickness can be determined, from the change of the amount of the electric current flowed through the objective-lens actuator 11 and the amount of movement of the objective lens with respect to the value of the electric current, namely the focusing sensitivity of the objective-lens actuator 11, from the position determined to be the position of the surface of the optical disc to the position determined to be the position of the information recording layer. Further, it is desirable to store the value of the designed focusing sensitivity of the objective-lens actuator 11 and the value of its focusing sensitivity measured during manufacturing, in a nonvolatile memory or the like, not shown.

In order to determine the base-material thickness from the focusing sensitivity of the objective-lens actuator 11, the following method is employed, for example. Assuming that the focusing sensitivity of the objective-lens actuator 11 is FK (mm/mA), the amount of the electric current flowing through the objective-lens actuator 11 at the time of the passage through the optical disc surface is $I_1$, (mA), and the amount of the electric current flowing through the objective-lens actuator 11 when the objective-lens actuator 11 is moved from the position at which it existed at the time of the passage through the optical surface, in the direction of focusing, namely in the direction along the optical axis of the objective lens, is $I_2$(mA), the amount DA (mm) of the movement of the objective-lens actuator can be determined through the calculation of $DA=FK(I_2-I_1)$. It is also possible to estimate simply the amount of the movement of the actuator from the time period during which the actuator was moved, for example. However, by determining the amount of the movement of the objective-lens actuator 11 using the focusing sensitivity of the objective-lens actuator 11 as in the present example, it is possible to increase the accuracy, thereby offering the advantage of preventing the impingement between the objective lens and the optical disc more certainly. In the aforementioned example, there has been described a case where the focusing sensitivity FK is defined as the amount of movement of the converged spot within the base-material thickness of the optical disc per unit electric current. In the case where the focusing sensitivity FK is defined as the amount of movement of the converged spot in air per unit electric current, the value of DA is increased by an amount corresponding to the refractive index of the optical-disc base material, and the relationship of $DA=FK \cdot n(I_2-I_1)$ holds, wherein the refractive index of the optical disc base material is n.

In order to reduce the probability of the impingement of the objective lens on the optical disc in determining the base-material thickness by moving the objective lens in the direction of the optical axis as described above, it is preferable to make the distance D from the surface of the objective lens to the position of the focal point greater. The converged lights formed by the respective wavelengths are designed in consideration of various base-material thicknesses. In order to make comparison of D, it is necessary to convert the distance D into a so-called air-equivalent length, namely a distance in the case where no base-material exists, for making comparison of D. As a matter of cause, by using, at first, a focal point formed by a wavelength which makes the air-equivalent length of D greater in determining the base-material thickness, it is possible to offer the advantage of reduction of the probability of the impingement of the objective lens on the optical disc.

The air-equivalent length can be determined as D=(Base-Material Thickness)/n+WD, in general, wherein n is the refractive index of the base material, and WD is the working distance. That is, by generating, at first, light with a wavelength which maximizes the sum of the quotient resulted from the division of the base-material thickness by the base-material refractive index and the working distance in determining the base-material thickness, it is possible to reduce the probability of the impingement of the objective lens on the optical disc.

Further, light with a longer wavelength, such as infrared light for the CD as the fourth optical disc, is required to form a converged spot through a base material having a larger thickness, and, therefore, it is desirable to make the distance D greater for light with a longer wavelength. This can be realized by providing a concave-lens shaped diffraction lens as the blade-shaped diffraction structure of the second objective lens 10b, for example. Light with a longer wavelength is affected more largely by the concave lens, thereby making the focal length greater and making the distance D greater, since the angle of diffraction of such light with a longer wavelength by the diffraction structure having the same period becomes greater. In the case of making the distance D greater for a longer wavelength as described above, light with a longest wavelength, that is infrared light in the present example, can be generated at first for determining the base-material thickness, which can reduce the probability of probability of the impingement of the objective lens on the optical disc. Further, by generating, at first, light with a wavelength which maximizes the focal length in determining the base-material thickness, it is possible to offer the advantage of reduction of the impingement of the objective lens on the optical disc.

By generating, at first, light with a wavelength which requires a largest base-material thickness for minimizing the spherical aberration of the focal point converged by the objective lens and determining the type of the optical disc on the basis of signals obtained from the optical head while moving the aforementioned objective lens in the direction of the optical axis through the objective-lens actuator, on the basis of the aforementioned consideration, it is also possible to offer the advantage of reduction of the probability of the impingement of the objective lens on the optical disc.

Hereinafter, there will be described a method for determining the type of an optical disc, in cases of making the distance D greater, maximizing the sum of the working distance and the quotient resulted from the division of the base-material thickness by the base-material refractive index and using infrared light as light with a wavelength which increases the focal length.

(First Example of Processing for Determining Type of Optical-Disc)

If the electric circuit 153 generates a command for replay of an optical disc (#1), the infrared-light laser diode 1b provided in the optical head device 40 is caused to emit light (#2).

Thereafter, the objective-lens actuator 11 provided in the optical head device 40 is driven to move the objective lens 10b in the optical head device 40 in the direction perpendicular to an information recording layer in the optical disc (#3). At this time, the objective lens is moved by a focus driving device, in the direction in which it approaches the optical disc from a position far from the optical disc.

At the same time, the electric circuit 153 monitors focus error signals detected by the optical head device 40 during the movement of the objective lens 10b, sets a slice level voltage G for detecting focus error signals and makes comparison between the voltage G and the focus error signal voltage for detecting that the focal point of the converged-light spot approaches the disc surface and a recording layer. Also, instead of focus error signals, it is possible to employ either the total amount of light reflected by the optical disc or both focus error signals and the total amount of light reflected by the optical disc.

As described above, it is possible to determine the distance from the surface to the recording layer adjacent to the surface, from the change of the value of the voltage applied to the focus driving device or the change of the value of the electric current flowed through the focus driving device, from the time when the passage of the focal point of the converged-light spot through the surface was detected to the time when the passage of the focal point of the converged-light spot through the next recording layer was detected.

Then, it is determined whether or not there is an information recording layer corresponding to that of a first optical disc, namely whether or not there is a reflective layer at a distance equal to or less than about 0.1 mm or 0.11 mm from the surface thereof (#4). If there is a recording layer corresponding to that of a first optical disc, it is determined that this optical disc is a first optical disc. Then, the optical path is set by the optical-path switching device 5 (#5), blue light is generated instead of infrared light (#6) and, also, focus servo is applied to the recording layer at a distance of about 0.1 mm from the surface and replay of the first optical disc 40 is started.

In this case, when the optical head includes the optical-path switching device 5 for switching between the optical paths leading to the objective lenses for light emitted from the light sources as described with reference to FIG. 1, blue light is generated, and the optical path is set, through the aforementioned optical-path switching device 5, to the optical path leading to the objective lens having a larger numerical aperture of 0.85 or more and being capable of converging the blue light with a smallest aberration when the blue light is passed through a base material with a thickness of 0.11 mm or less. As described above, the objective lens 10 b having a smaller numerical aperture and a greater working distance is employed until the determination as to whether or not there is an information recording layer at a distance of 0.11 mm or less from the surface and, if there is an information recording layer at a distance equal to or less than 0.11 mm, then the optical path is set, through the optical-path switching device 5, to the optical path leading to the objective lens 10a having a larger numerical aperture of 0.85 or more and being capable of converging the light with a smallest aberration, which offers the advantage of preventing, more certainly, the impingement between the objective lens and the optical disc.

On the other hand, if there is no recording layer corresponding to that of a first optical disc 40, namely if there is no recording layer at a distance of 0.11 mm or less from the surface of the disc (NO at #4), the objective lens 10b is continuously moved in the direction in which it approaches the optical disc, by the objective-lens actuator 11 (#7). Then, it is determined whether or not there is a reflective layer at a distance of about 0.6 mm from the surface, that is to say, at a distance in the range of about 0.5 mm to 0.7 mm from the surface, on the basis of focus error signals and the total amount of light reflected by the optical disc (#8). If there is a reflective layer at a distance of about 0.6 mm from the surface, the objective lens 10b is continuously moved by at least about 0.1 mm in the direction in which it approaches the optical disc, by the focus driving device (#9), and, then, it is determined whether or not there are a plurality of reflective layers in a range around at a distance of about 0.6 mm from the surface (#10). Then, if it is determined that there is no reflective layer at a deeper position in a range around at a distance of about 0.6 mm from the surface, blue light is emitted, instead of the infrared light (#11).

At this time, the blue light is emitted and, also, the optical path is set, through the optical-path switching device 5, to the optical path leading to the objective lens 10b capable of converging the blue light with a smallest aberration when the blue light is passed through a base material with a thickness of about 0.6 mm.

Then, focus servo is applied to the reflective layer farthest from the surface, out of the reflective layers around at a distance of about 0.6 mm from the surface. Then, it is determined whether or not the reflective layer is a recording layer corresponding to that of a second optical disc 60, on the basis of the amplitude and the modulation degree of tracking error signals or the modulation degree of information replay signals or the quality of information replay signals such as the error rate of information replay signals (#12). If it is determined that the reflective layer is a recording layer corresponding to that of a second optical disc 60, replay is started at this state (#13). If it is not determined that the reflective layer is a recording layer corresponding to that of a second optical disc 60, the emission of the blue light is stopped, and red light is emitted (#14).

At this time, the red light is emitted and, also, the optical path is set, through the optical-path switching device 5, to the optical path leading to the objective lens 10b capable of converging the red light with a smallest aberration when the red light is passed through a base material with a thickness of about 0.6 mm.

Then, focus servo is applied to the reflective layer closest to the surface, out of the reflective layers around at a distance of about 0.6 mm from the surface, and replay of information is started by regarding the optical disc as a third optical disc (DVD) 70 (#14).

In a mixed disc, the reflective layer farthest from the surface, out of reflective layers around at a distance of about 0.6 mm from the surface, is a recording layer corresponding to that of a second optical disc 60. As described above, if there is a reflective layer at a distance of about 0.6 mm from the surface, the objective lens is continuously moved by at least about 0.1 mm in the direction in which it approaches the optical disc through the objective-lens actuator 11 to determine whether or not there are in plurality of reflective layers in a range around a distance of about 0.6 mm from the surface, then blue light is emitted, and focus servo is applied to the reflective layer farthest from the surface at first, which offers the advantage of certainly replaying images with high qualities and information with large capacities, without missing the presence of recording layers with high densities, in performing replay of a mixed disc.

Further, if there is no reflective layer either at a distance of about 0.1 mm or less or at a distance of about 0.6 mm from the surface (NO in #8), the objective lens is continuously moved in the direction in which it approaches the optical disc through the objective-lens actuator 11 while maintaining the emission of the infrared light (#15). Then, it is determined whether or not there is a reflective layer at a distance of about 1.2 mm from the surface, that is to say, at a distance in the range of about 0.8 mm to 1.5 mm, on the basis of focus error signals and the total amount of light reflected by the optical disc (#16). If there is a reflective layer at a distance of about 1.2 mm from the surface, focus servo is applied to the reflective layer with a base material having a thickness of about 1.2 mm and replay of information is started by regarding the optical disc as a fourth optical disc (CD) 80 (#17).

At this time, the optical path is set, through the aforementioned optical-path switching device 5, to the optical path leading to the objective lens capable of converging the infrared light with a smallest aberration when the infrared light is passed through a base material with a thickness of about 1.2 mm.

Further, if no reflective layer is found at the portion other than the surface, at a distance greater than about 1.2 mm or 1.5 mm from the surface (NO in #16), it is preferable to restart searching for a reflective layer from a position near the surface. In the case where searching is restarted, the number of times that searching is performed can be limited to, for example, five times.

With the structure of the present invention, it is possible to offer the advantage of replaying or recording information from or to various types of optical discs with a single optical disc drive. Further, in determining the type of an optical disc, it is possible to prevent the impingement of the optical disc and the optical disc on each other, thereby preventing the surface of the optical disc from being blemished and preventing the optical head device from being damaged. Further, in performing replay of a mixed disc, it is possible to replay, certainly, images with high qualities and information with large capacities, without missing the presence of recording layers with high densities.

(Second Example of Processing for Determining Type of Optical Disc)

Figure 6:
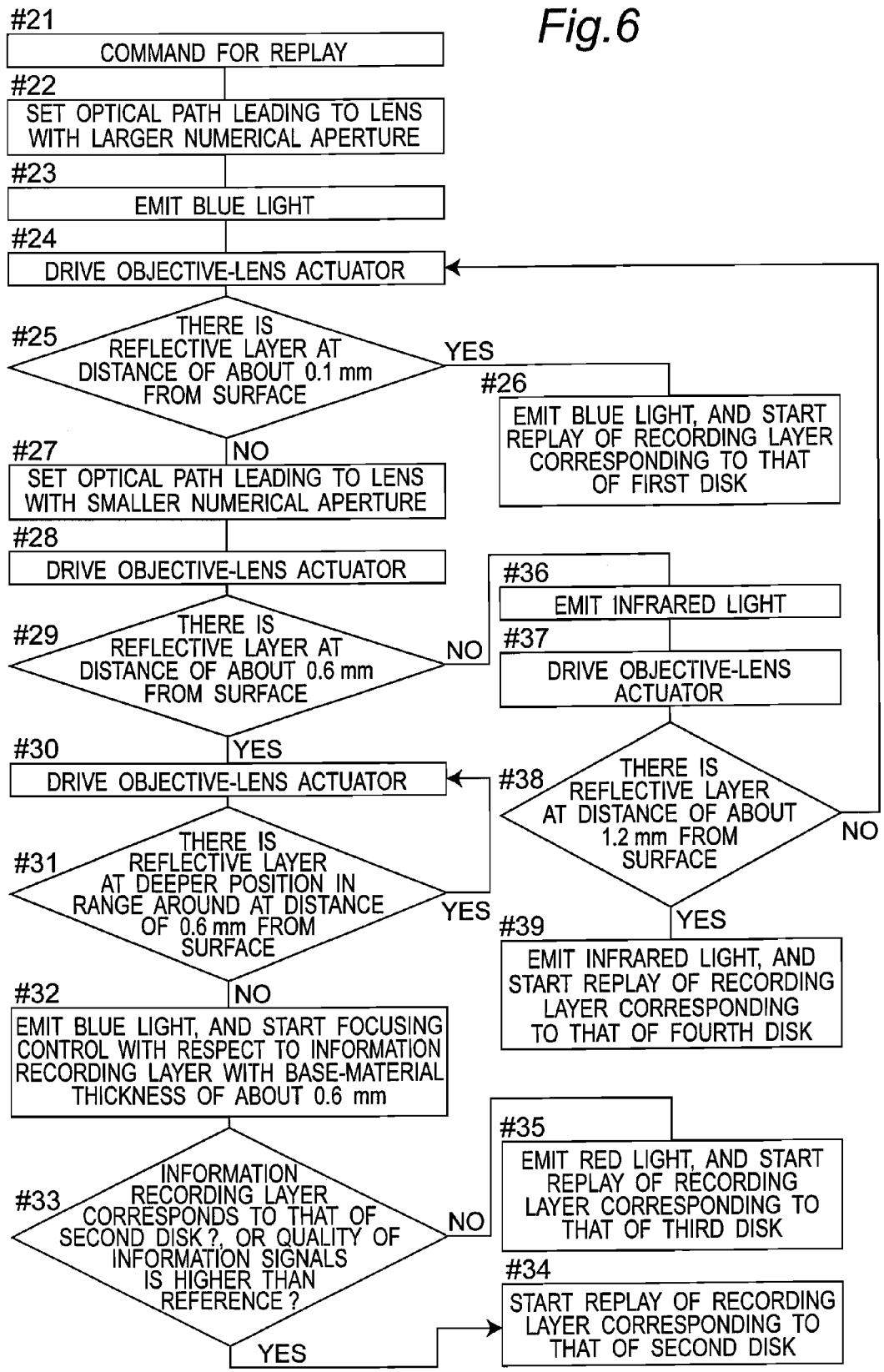
FIG. 6 is a flow chart illustrating a determination method according to an embodiment of the present invention.

Also, as illustrated in a flow chart of FIG. 6 according to an exemplary modification of an example of the processing for determining the type of an optical disc in FIG. 6, it is possible to generate light with a shortest wavelength when a command for replay is generated.

As illustrated in FIG. 6, blue light with a shortest wavelength is emitted, at first (#21). By using the shortest wavelength, it is possible to replay or record information from and to an optical disc with a highest density. The optical disc drive for performing replaying and recording from and to various types of optical discs according to the present application is expected to treat, frequently, optical discs with highest densities. Accordingly, light with a shortest wavelength is emitted, which offers the advantage of starting rapidly focusing control with respect to such an optical disc with a highest density. When blue light is emitted at first, in order to start rapidly focusing control with respect to an optical disc with a highest density, it is desirable to set the optical path to the optical path leading to the objective lens 10a with a larger numerical aperture equal to or more than 0.85 (#22).

Thereafter, the objective-lens actuator 11 provided in the optical head device 40 is driven to move the objective lenses 10a and 10b in the optical head device 40 in the direction perpendicular to an information recording layer in the optical disc (#24). At this time, the objective lenses are moved by the objective-lens actuator 11, in the direction in which they approach the optical disc from a position far from the optical disc.

At the same time, the electric circuit 153 monitors focus error signals detected by the optical head device 40 during the movement of the objective lenses, sets a slice level voltage G for detecting focus error signals and makes comparison between the voltage G and the focus error signal voltage for detecting that the focal point of the converged-light spot approaches the disc surface and a recording layer. Also, instead of focus error signals, it is possible to employ either the total amount of light reflected by the optical disc or both focus error signals and the total amount of light reflected by the optical disc.

As described above, it is possible to determine the distance from the surface to the recording layer adjacent to the surface, from the change of the value of the voltage applied to the focus driving device or the change of the value of the electric current flowed through the focus driving device, from the time when the passage of the focal point of the converged-light spot through the surface was detected to the time when the passage of the focal point of the converged-light spot through the next recording layer was detected.

Then, it is determined whether or not there is an information recording layer corresponding to that of a first optical disc, namely whether or not there is a reflective layer at a distance equal to or less than about 0.1 mm or 0.11 mm from the surface thereof (#25). If there is a recording layer at a distance corresponding to the first optical disc, it is determined that this optical disc is a first optical disc 50. Then, focus servo is applied, using the blue light, to the recording layer at a distance of about 0.1 mm from the surface to start replay of the first optical disc 40 to start replay of the first optical disc (#26). In this case, when the optical head includes the optical-path switching device 5 for switching between the optical paths leading to the objective lenses for light emitted from the light sources as described with reference to FIG. 1, blue light is emitted, and the optical path is set, through the optical-path switching device 5, to the optical path leading to the objective lens 10a having a larger numerical aperture of 0.85 or more and being capable of converging the blue light with a smallest aberration when the blue light is passed through a base material with a thickness of 0.11 mm or less.

On the other hand, if there is no recording layer at a distance corresponding to a first optical disc, the optical path is set, through the optical-path switching device 5, to the optical path leading to the objective lens having a smaller numerical aperture and being capable of converging the light with a smaller aberration when the light is passed through a base material with a thickness greater than 0.11 mm (#27) and, then, the objective lenses 10a and 10b are moved in the direction in which they approach the optical disc, by the objective-lens actuator 11 (#28). Then, it is determined whether or not there is a reflective layer at a distance of about 0.6 mm from the surface, that is to say, at a distance in the range of about 0.5 mm to 0.7 mm from the surface, on the basis of focus error signals and the total amount of light reflected by the optical disc (#29). If there is a reflective layer at a distance of about 0.6 mm from the surface, the objective lenses are further continuously moved by at least about 0.1 mm in the direction in which they approach the optical disc through the focus driving device (#30), and it is determined whether or not there are a plurality of reflective layers in a range around a distance of about 0.6 mm from the surface (#31). At this time, similarly, the blue light is emitted.

Then, focus servo is applied to the reflective layer farthest from the surface, out of the reflective layers around at a distance of about 0.6 mm from the surface (#32). Then, it is determined whether or not the reflective layer is a recording layer corresponding to that of a second optical disc 60, on the basis of the amplitude and the modulation degree of tracking error signals or the modulation degree of information replay signals or the quality of information replay signals such as the error rate of information replay signals (#33). If it is determined that the reflective layer is a recording layer corresponding to that of a second optical disc 60, then replay is started at this state (#34). If it is not determined that the reflective layer is a recording layer corresponding to that of a second optical disc, the emission of the blue light is stopped, and red light is emitted.

At this time, the red light is emitted and, also, the optical path is set, through the optical-path switching device 5, to the optical path leading to the objective lens 10b capable of converging the red light with a smallest aberration when the red light is passed through a base material with a thickness of about 0.6 mm.

Then, focus servo is applied to the reflective layer closest to the surface, out of the reflective layers around at a distance of about 0.6 mm from the surface, and replay of information is started by regarding the optical disc as a third optical disc 70 (#35).

In a mixed disc, a reflective layer farthest from the surface, out of reflective layers around at a distance of about 0.6 mm from the surface, is a recording layer corresponding to a second optical disc 60. As described above, when there is a reflective layer at a distance of about 0.6 mm from the surface, the objective lenses are continuously moved by at least about 0.1 mm in the direction in which they approach the optical disc through the focus driving device to determine whether or not there are a plurality of reflective layers in a range around a distance of about 0.6 mm from the surface, then blue light is emitted, and focus servo is applied to the reflective layer farthest from the surface at a distance equal to or less than 0.8 mm at first, which can offer the advantage of certainly replaying images with high qualities and information with large capacities, without missing the presence of recording layers with high densities, in performing replay of a mixed disc.

If there is no reflective layer either at a distance of about 0.1 mm or less or at a distance of about 0.6 mm from the surface, infrared light is emitted (#36) and, then, the objective lenses are continuously moved in the direction in which they approach the optical disc through the objective-lens actuator 11 (#37). Then, it is determined whether or not there is a reflective layer at a distance of about 1.2 mm from the surface, that is to say, at a distance in the range of about 0.8 mm to 1.5 mm from the surface, on the basis of focus error signals and the total amount of light reflected by the optical disc (#38). If there is a reflective layer at a distance of about 1.2 mm from the surface, focus servo is applied to the reflective layer with a base material having a thickness of about 1.2 mm and replay of information is started by regarding the optical disc as a fourth optical disc 80 while maintaining the emission of the infrared light.

At this time, the optical path is set, through the optical-path switching device 5, to the optical path leading to the objective lens 10b capable of converging the infrared light with a smallest aberration when the infrared light is passed through a base material with a thickness of about 1.2 mm.

Further, if no reflective layer is found at the portion other than the surface, at a distance greater than about 1.2 mm or 1.5 mm from the surface (NO in #38), it is preferable to restart searching for a reflective layer from a position near the surface. In the case where searching is restarted, the number of times that searching is performed can be limited to, for example, five times.

With the structure of the present invention, it is possible to offer the advantage of replaying or recording information from or to various types of optical discs with a single optical disc drive. Further, in determining the type of an optical disc, it is possible to start, rapidly, focusing control with respect to an optical disc with a highest recording density. Further, in performing replay of a mixed disc, it is possible to replay, certainly, images with high qualities and information with large capacities, without missing the presence of recording layers with high densities.

Further, there are generally three types of optical-disc base-material thicknesses to be determined, which are about 0.1 mm, about 0.6 mm and about 1.2 mm. In consideration of the fact that discs having larger thicknesses have existed since earlier times and have been commercially available while having had larger base-material thickness errors, it is preferable to use boundary thickness values smaller than average values, and it is preferable to set them to about 0.2 mm and about 0.8 mm. That is, the aforementioned determination as to whether or not there is a recording layer at a depth of about 0.1 mm or 0.11 mm can be changed to determination as to whether or not there is a recording layer at a depth of 0.2 mm or less. Further, the aforementioned determination as to whether or not there is a recording layer at a depth of about 0.6 mm or at a depth in the range of 0.5 mm to 0.7 mm can be changed to determination as to whether or not there is a recording layer at a depth in the range of 0.2 mm to 0.8 mm. By setting the boundaries for determining the thickness as described above, it is possible to offer the advantage of reducing false determinations and starting, rapidly, recording and replaying information to and from an optical disc.

In any of the optical head devices illustrated in FIGS. 1 to 3 in the present examples, light with any wavelength can be received by the common photo detector 18. With this structure, it is possible to use the same photo detector even if the wavelength of emitted light is switched, thereby offering the advantage of reduction of the number of components. Further, there is no need for switching the supply of electricity to the photo detector or the application of a voltage to the photo detector, thereby offering the advantage of rapidly switching the wavelength of emitted light.

Second Embodiment

Hereinafter, there will be described an embodiment of an optical information system, such as a computer, which includes the optical disc drive described in the first embodiment and an operation circuit for performing processing such as operations or conversions on signals obtained from the optical disc drive.

An optical information system, such as a computer, an optical disc player or an optical disc recorder, which includes the optical disc drive according to any one of the aforementioned embodiments or utilizes the aforementioned recording and replaying methods is capable of drawing a focus in desired recording layers in a short period of time, for two types of optical discs which are a first optical disc 50 and a second optical disc 60, thereby realizing a system with excellent usability which reduces the waiting time at the time of start of the use of an optical disc.

At first, there will be described an embodiment of a computer including the optical disc drive 167 described in the first embodiment.

Figure 7:
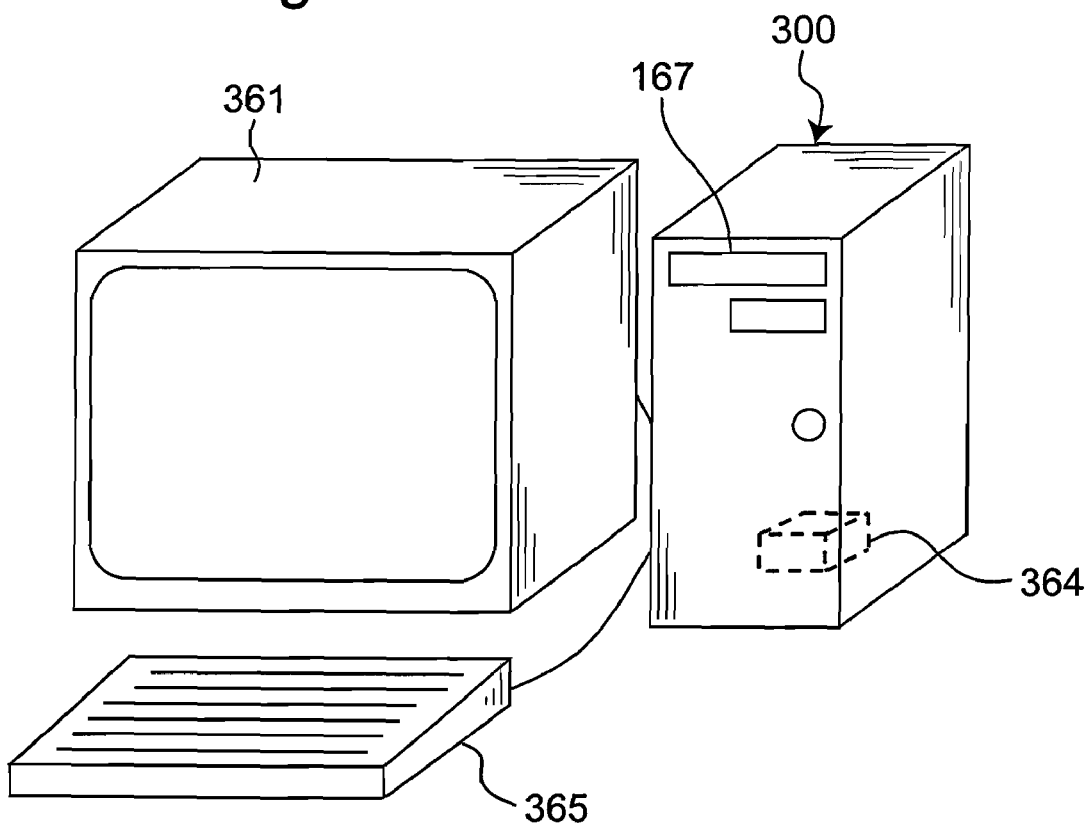
FIG. 7 is a schematic perspective view illustrating the structure of a computer according to an embodiment of the present invention.

Referring to FIG. 7, there is formed a computer 300 including the optical disc drive 167 according to the first embodiment, an input device 365 for inputting information, such as a key board, a mouse or a touch panel, an operation device 364 such as a central processing unit (CPU) which performs operations on the basis of information inputted through the aforementioned input device and information read through the aforementioned optical disc drive 167, and an output device 361 such as a Braun tube or a liquid crystal display device for displaying information such as the results of operations performed by the aforementioned operation device, or a printer.

Third Embodiment

Figure 8:
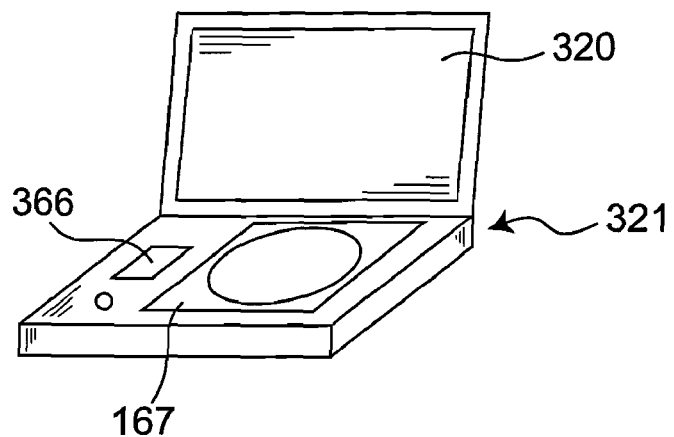
FIG. 8 is a schematic perspective view illustrating an optical disc player and a car navigation system according to an embodiment of the present invention.

With reference to FIG. 8, there will be described an optical disc player as an exemplary optical information system including the optical disc drive described in the first embodiment.

Referring to FIG. 8, there is formed an optical disc player 321 including the optical disc drive 167 according to the first embodiment and an information-to-image conversion device (for example, a decoder 366) for converting information signals obtained from the optical disc drive into images. Further, by adding a position sensor, such as a GPS, and a central processing unit (CPU) to this structure, it is possible to utilize the structure as a car navigation system. Also, the system can be adapted to include a display device 320 such as a liquid crystal display monitor.

Fourth Embodiment

Hereinafter, there will be described an embodiment of an optical disc recorder as an exemplary optical information system including the optical disc drive described in the first embodiment.

Figure 9:
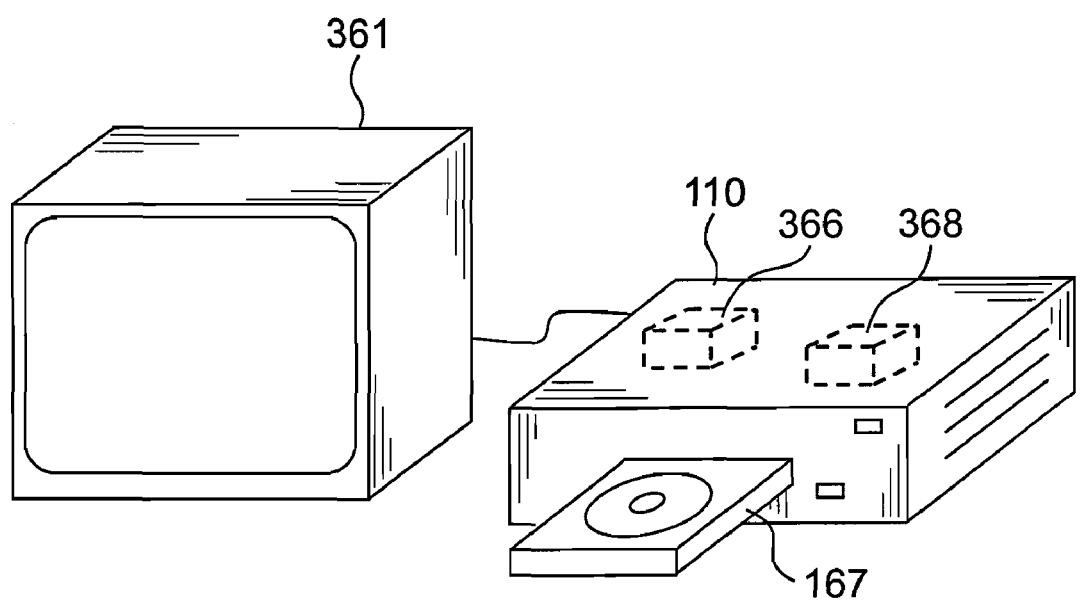
FIG. 9 is a schematic perspective view illustrating the structure of an optical disc recorder according to an embodiment of the present invention.

With reference to FIG. 9, the structure of an optical disc recorder will be described. Referring to FIG. 9, there is formed an optical disc recorder 110 including the optical disc drive 167 according to the first embodiment, and an image-to-information conversion device (for example, an encoder 368) for converting image information into information to be recorded to an optical disc through the optical disc drive. Desirably, the optical disc recorder 110 further includes an information-to-image conversion device (decoder 366) for converting information signals obtained from the optical disc drive into images, which enables replay of parts of the optical disc in which information has been already recorded. Also, the optical disc recorder 110 can further include an output device 361 such as a Braun tube or a liquid crystal display device for displaying information, or a printer.

Fifth Embodiment

Figure 10:
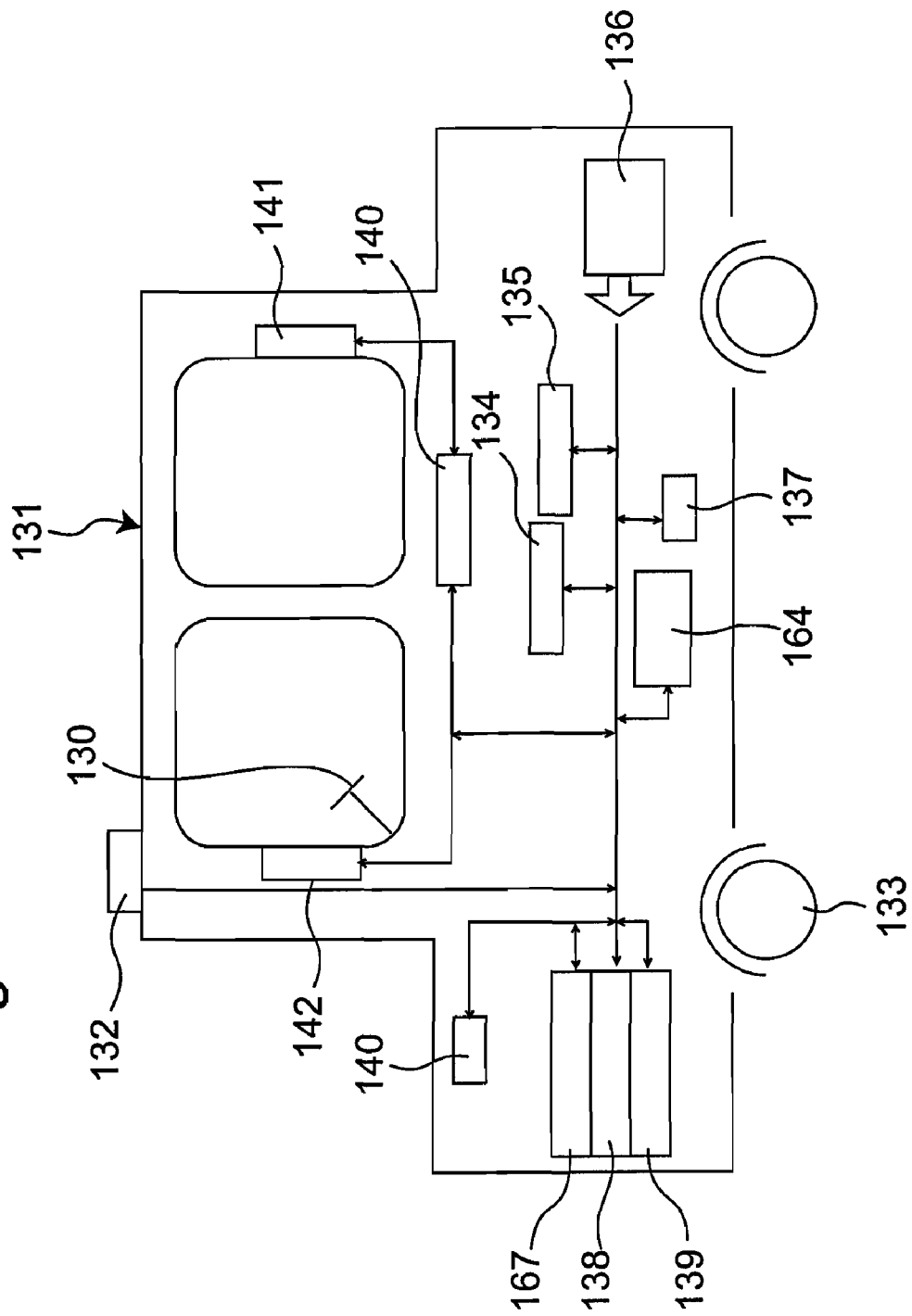
FIG. 10 is an explanation view illustrating the structure of a vehicle according to an embodiment of the present invention.
Figure 11:
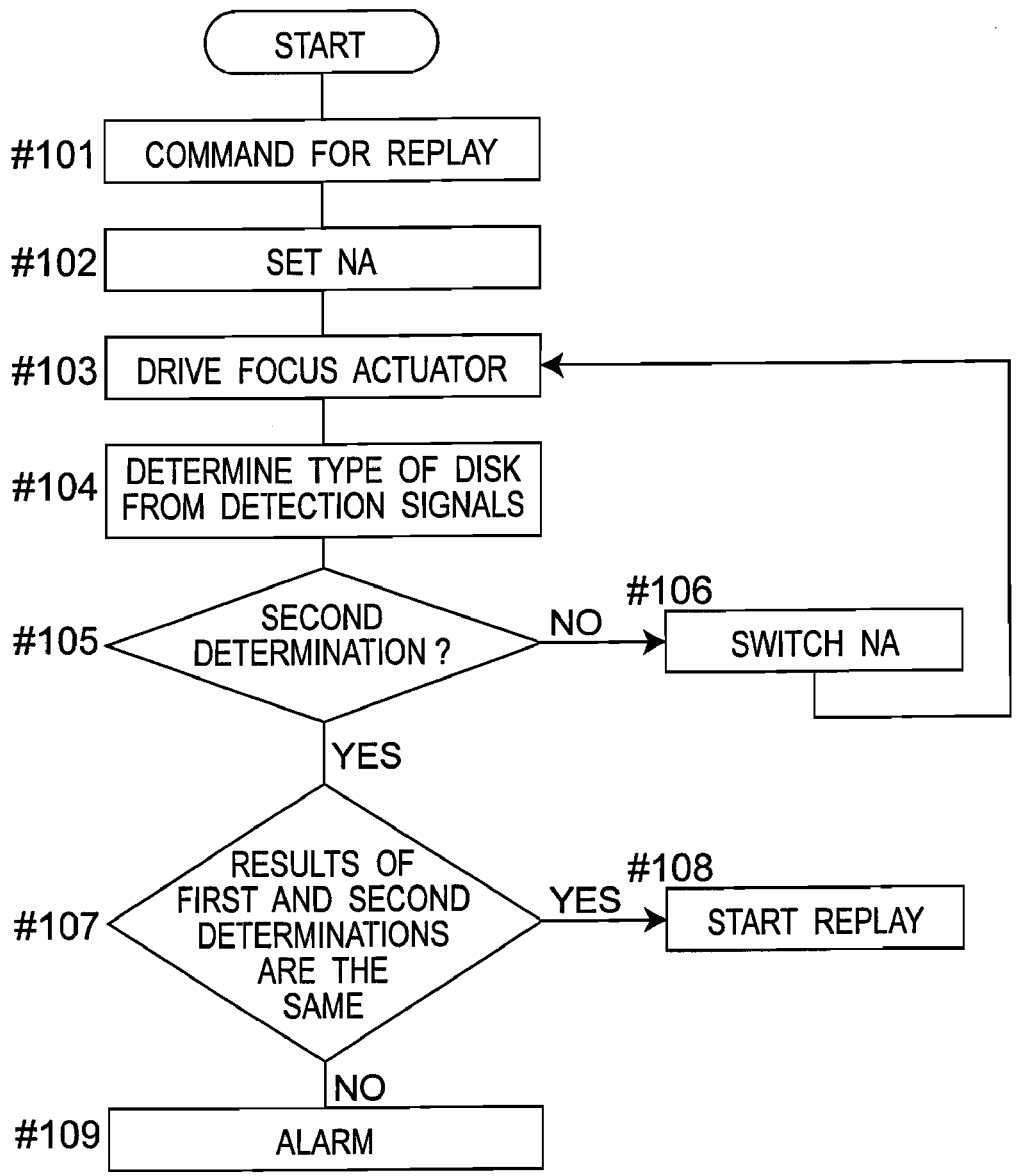
FIG. 11 is a flow chart illustrating a conventional determination method.

With reference to FIG. 10, there will be described an embodiment of an exemplary optical information system including the optical disc drive. Referring to FIG. 10, there is provided an optical disc drive 167 which is the optical disc drive described in the first embodiment. 131 is a vehicle equipped with the optical disc drive 167, and 134 is a power generating portion which generates power for moving the vehicle 131. Further, the optical information system includes a fuel storage portion 135 for storing fuel to be supplied to the power generating portion 134 and/or a power supply 136. By mounting the optical disc drive 167 according to the present application to the vehicle as described above, it is possible to offer the advantage of stably obtaining information from various types of optical discs or recording information to various types of optical discs, while staying within the movable body. Further, in cases where the vehicle is a train or a car, the vehicle further includes wheels 133. Further, in the case where the vehicle is a car, the vehicle includes a handle for changing the direction.

Further, the optical information system can include a changer 138 and an optical disc housing portion 139, which enables easily using a plurality of optical discs. The optical information system can include an operation device 164 for processing information obtained from optical discs into images, a semiconductor memory 137 for temporarily storing information and a display device 142, which enables replaying image information from optical discs. Further, the optical information system can include an amplifier 140 and a speaker 141, which enables replaying sounds and tunes from optical discs. Further, the optical information system can include a position sensor such as a GPS 132, which enables knowing the current position and the direction of travel, from images displayed on the display device 142 and sounds generated from the speaker 141, along with map information replayed from optical discs. Further, the optical information system can include a wireless communication portion 140, which enables acquiring information from the outside and using it complementally to information from optical discs.

Further, while there have been illustrated the output device 361 and the liquid crystal display monitor 320 in FIGS. 7 to 9, in the aforementioned second to fourth embodiments, it goes without saying that these systems can be provided as products including output devices without including the output device 361 and the liquid crystal display monitor 320 such that the output device 361 and the liquid crystal display monitor 320 are made commercially available separately from the systems. Further, although there are illustrated no input device in FIG. 8 and FIG. 9, the systems can be provided as products equipped with an input device, such as a key board, a touch panel, a mouse or a remote control device. On the contrary, in the aforementioned second to fourth embodiments, the systems can be structured to include only an input terminal, as an input device.

The optical disc drive according to the present invention is capable of rapidly performing replay of various types of optical discs. Further, the optical disc drive according to the present invention can be applied and extended to various types of optical information systems which store information, such as computers, optical disc players, optical disc recorders, car navigation systems, edition systems, data servers, AV components, and vehicles.

Further, arbitrary embodiments, out of the aforementioned embodiments, can be properly combined, which can offer the advantages of the respective embodiments.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An optical disc drive comprising:
   an optical head device comprising:
      a plurality of light sources emitting laser light of different wavelengths;
      an objective lens that converges the laser light emitted from the plurality of light sources onto an information recording layer of an optical disc;
      a photo detector that receives light reflected by the information recording layer of the optical disc, when the laser light emitted from the plurality of light sources is converged onto the information recording layer by the objective lens and that photoelectrically converts the received light into electric signals; and an objective-lens actuator for moving the objective lens in a direction of an optical axis of the objective lens;

a motor for rotating the optical disc; and a control device for controlling operations of the optical head device and the motor;

wherein the objective lens comprises a diffraction lens that diffracts the laser light emitted from the plurality of light sources, such that a laser light, emitted from the plurality of light sources, having a longer wavelength increases a focal length of the objective lens on the optical axis at a side of the optical disc, and such that a focal point of the converged laser light is positioned on the optical axis of the objective lens, wherein, when the control device outputs a command to replay signals, the control device (i) causes a first laser light to be initially emitted from one light source of the plurality of light sources emitting the laser light of different wavelengths before determining a type of a pre-replayed optical disc, and (ii) determines a type of the optical disc based on signals obtained from the optical head device as a result of the first laser light initially emitted, while moving, via the objective-lens actuator, the objective lens in the direction of the optical axis of the objective lens, wherein a wavelength of the first laser light (i) maximizes an air-equivalent length between the focal point converged by the objective lens and a surface of the objective lens, and (ii) is a longest wavelength of the different wavelengths of the laser light emitted by the plurality of light sources, wherein, when no information recording layer is found as a result of a searching for the information recording layer by moving the objective lens toward the optical disc beyond a given distance in the direction of the optical axis of the objective lens after the surface of the optical disc is found, the searching for the information recording layer from near the surface of the optical disc is restarted, and wherein a number of times that the searching is performed is limited.

2. The optical disc drive according to claim 1, wherein a wavelength of the first laser light, which maximizes the air-equivalent length between the focal point converged by the objective lens and the surface of the objective lens, maximizes a focal length of the objective lens.

3. The optical disc drive according to claim 1, wherein a wavelength of the first laser light, which maximizes the air-equivalent length between the focal point converged by the objective lens and the surface of the objective lens, maximizes a thickness of a base material which minimizes a spherical aberration of the converged focal point.

4. The optical disc drive according to claim 1, wherein the laser light emitted by the plurality of light sources includes infrared light, and wherein, when the control device outputs the command to replay signals, the control device (i) causes the infrared light to be emitted at first, and (ii) determines the type of the optical disc based on signals obtained from the optical head device as a result of the infrared light emitted at first, while moving, via the objective-lens actuator, the objective lens in the direction of the optical axis of the objective lens.

5. The optical disc drive according to claim 1, wherein the laser light emitted by the plurality of light sources includes a blue light, wherein the optical head device comprises a first objective lens, a second objective lens, and an optical-path switching device for switching an optical path of the laser light emitted from the plurality of light sources between an optical path leading to the first objective lens and an optical path leading to the second objective lens, wherein the control device determines the type of the optical disc based on signals obtained from the optical head, and wherein, when the control device determines that the optical disc is of a type including the information recording layer located at a distance not more than 0.2 mm from a surface of the optical disc, then the control device (i) causes the blue light to be emitted from the plurality of light sources, and (ii) sets, via the optical-path switching device, the optical path of the blue light to an optical path leading to an objective lens, of the first objective lens and the second objective lens, capable of converging the blue light with a smallest aberration, when the blue light passes through a base material with a thickness of about not more than 0.2 mm.

6. The optical disc drive according to claim 1, wherein the optical head device is structured to receive, via a common photo detector, the laser light of different wavelengths.

* * * * *